US007582405B2

(12) United States Patent
Gore

(10) Patent No.: US 7,582,405 B2
(45) Date of Patent: Sep. 1, 2009

(54) IMAGE RECORDING MEDIA AND IMAGE LAYERS

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/259,659

(22) Filed: Oct. 26, 2005

(65) Prior Publication Data

US 2007/0092833 A1 Apr. 26, 2007

(51) Int. Cl.

| | |
|---|---|
| ***G03C 1/00*** | (2006.01) |
| ***B41M 5/24*** | (2006.01) |
| ***B32B 3/02*** | (2006.01) |
| ***G11B 7/24*** | (2006.01) |

(52) U.S. Cl. ............................. 430/270.1; 430/270.11; 503/218; 428/64.4

(58) Field of Classification Search ............. 430/270.1; 503/200, 209, 216, 217, 218; 106/31.16, 106/31.17, 31.18, 31.19, 31.2, 31.21

See application file for complete search history.

(56) References Cited

U.S. PATENT DOCUMENTS

| | | | | |
|---|---|---|---|---|
| 4,017,313 | A * | 4/1977 | Hartzler | 430/346 |
| 4,046,074 | A * | 9/1977 | Hochberg et al. | 346/25 |
| 4,054,684 | A * | 10/1977 | Ceintrey et al. | 503/201 |
| 4,237,212 | A * | 12/1980 | Inoue et al. | 430/346 |
| 4,392,141 | A * | 7/1983 | Inoue et al. | 347/224 |
| 4,421,344 | A * | 12/1983 | Ikezawa et al. | 503/209 |
| 5,709,737 | A * | 1/1998 | Malhotra et al. | 106/31.43 |
| 6,031,044 | A * | 2/2000 | Kokel et al. | 524/839 |
| 6,323,332 | B1 * | 11/2001 | Fukuda et al. | 536/23.2 |
| 6,680,205 | B1 * | 1/2004 | Elhard et al. | 436/166 |
| 6,890,614 | B2 * | 5/2005 | Gore et al. | 428/64.1 |
| 7,060,654 | B2 * | 6/2006 | Kasperchik et al. | 503/208 |
| 2003/0186176 | A1 * | 10/2003 | Arakawa et al. | 430/350 |
| 2004/0146812 | A1 * | 7/2004 | Gore et al. | 430/343 |
| 2006/0078832 | A1 * | 4/2006 | Gore et al. | 430/332 |

* cited by examiner

*Primary Examiner*—Cynthia H Kelly
*Assistant Examiner*—Connie P Johnson

(57) ABSTRACT

Imaging layers, image recording media, and methods of preparation of each, are disclosed.

9 Claims, 1 Drawing Sheet

IMAGE RECORDING MEDIA AND IMAGE LAYERS

BACKGROUND

Compositions that produce a color change upon exposure to energy in the form of light are of great interest in producing images on a variety of substrates. For example, labeling of optical storage media such as Compact Discs, Digital Video Discs or Blue Laser Discs (CD, DVD, or Blue Laser Disc) can be routinely accomplished through screen-printing methods. While this method can provide a wide variety of label content, it tends to be cost ineffective for run lengths less than 300-400 discs because the fixed cost of unique materials and set-up are shared by all the discs in each run. In screen-printing, a stencil of the image is prepared, placed in contact with the disc and then ink is spread by squeegee across the stencil surface. Where there are openings in the stencil the ink passes through to the surface of the disc, thus producing the image. Preparation of the stencil can be an elaborate, time consuming and expensive process.

In recent years, significant increases in use of CD/DVD discs as a data distribution vehicle have increased the need to provide customized label content to reflect the data content of the disc. For these applications, the screen-label printing presents a dilemma as discs are designed to permit customized user information to be recorded in standardized CD, DVD, or Blue Laser Disc formats. Today, for labeling small quantities of discs, popular methods include hand labeling with a permanent marker pen, using an inkjet printer to print an adhesive paper label, and printing directly with a pen on the disc media which has a coating that has the ability to absorb inks. The hand printing methods do not provide high quality and aligning a separately printed label by hand is inexact and difficult.

It may therefore be desirable to design an optical data recording medium (e.g., CD, DVD, or Blue Laser Disc) which may be individually labeled by the user easily and inexpensively relative to screen-printing while giving a high quality label solution. It may also be desirable to design an optical data recording medium which accepts labeling via multiple methods, thus reducing the amount of inventory necessarily carried by optical data recording merchants and end users.

A variety of leuco dye-containing compositions have been investigated for use on optical disks and other substrates. Leuco dye compositions include a leuco dye along with an optional activator and an infrared absorber. However, the leuco dye compositions can be unstable and have limited color space. For this and other reasons, the need still exists for compositions which have improved stability, and which have improved image forming and developing characteristics.

SUMMARY

Briefly described, embodiments of this disclosure include image recording coating, and methods of preparation of recording medium. One exemplary embodiment of the image recording coating, among others, includes a substrate having a layer disposed thereon. The layer includes a matrix; a radiation absorbing compound; an inorganic acid or salt thereof; and a reactant compound, wherein the radiation absorbing compound absorbs radiation and initiates a reduction/oxidation reaction between the inorganic acid or salts thereof and the reactant compound to produce a color change.

One exemplary embodiment of the method for preparing an imaging recording medium, among others, includes: providing a matrix, a radiation absorbing compound, an inorganic acid or salt thereof, and a reactant compound, wherein the radiation absorbing compound absorbs radiation and initiates a reduction/oxidation reaction between the inorganic acid or salts thereof and the reactant compound to produce a color change; dissolving the radiation absorbing compound, the inorganic acid or salt thereof, and the reactant compound, in the matrix to form a matrix mixture; and disposing the matrix mixture onto a substrate.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Embodiments of the disclosure include image recording media, image layers, and methods of making each. The image-recording medium includes an image layer having inorganic acids or salts thereof. An oxidation reduction reaction of the inorganic acids or salts thereof can produce a mark on the image recording medium. Typical colorants (e.g., leuco dyes) are problematic in that they have low ambient stability, low contrast, and relatively slow response, while also needing a high concentration to produce a mark. In contrast, the image layer including the inorganic acids or salts thereof is stable in ambient light and can withstand temperature fluctuations. The image layer can be a coating disposed onto a substrate and used in structures such as, but not limited to, paper, digital recording material, and the like.

A clear mark and excellent image quality can be obtained by directing radiation energy (e.g., a 780 nm laser operating at 35 MW) at areas of the image layer on which a mark is desired. The components in the image layer used to produce the mark via a color change upon stimulation by energy can include, but are not limited to, inorganic acids or salts thereof, a radiation absorbing compound, and a reactant compound. The components are dissolved into a matrix material. When the radiation absorbing compound absorbs a particular radiation energy, it initiates a reduction/oxidation reaction between the inorganic acid or salts thereof and the reactant compound to produce a color change.

For example, a number of compounds react with phosphomolybdic acid or salts thereof to produce color, and are used in TLC detection methods as described in *Journal of Chromatography,* 132 (1977) 267-276 C, which is incorporated herein by reference. A number of other compounds are known to produce color reactions such as, but not limited to, lipids, steroids, lactones, keto acids, hydroxy acids, unsaturated fatty acids, phenolic compounds, and combinations thereof. A particular class of compounds useful in production of color is alpha amino alcohols containing $NH_2C(R1,R2)CH_2OH$, where R1 and R2 can include but are not limited to, hydrogen, aryl, or alkyl groups. In another embodiment, the image layer can also include a color former (e.g., a leuco dye) and an activator (e.g., a sulphonylphenol compound).

The radiation energy absorber functions to absorb radiation energy, convert the energy into heat, and deliver the heat to the reactants. The radiation energy may then be applied by an infrared laser. Upon application of the radiation energy, both the inorganic acid or salts thereof and the reactant compound may become heated and mix, which causes the inorganic acid or salt thereof to become activated and cause a mark (color) to be produced. In another embodiment, the color former and the activator are heated and the components react to form a mark. In the case of leuco dyes, both the inorganic salt and acid color former might cause color change.

Figure 1:
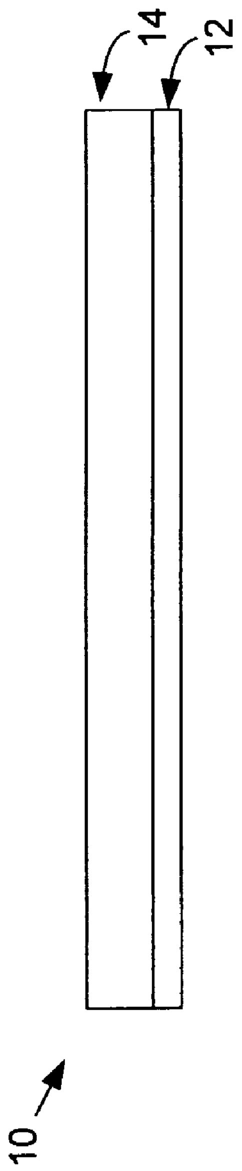
FIG. 1 illustrates an illustrative embodiment of the imaging medium.

FIG. 1 illustrates an embodiment of an imaging medium 10. The imaging medium 10 can include, but is not limited to, a substrate 12 and a layer 14. The substrate 12 may be a substrate upon which it is desirable to make a mark, such as, but not limited to, paper (e.g., labels, tickets, receipts, or stationery), overhead transparencies, a metal/metal composite, glass, a ceramic, a polymer, and a labeling medium (e.g., a compact disk (CD) (e.g., CD-R/RW/ROM) and a digital video disk (DVD) (e.g., DVD-R/RW/ROM)). In particular, the substrate 12 includes an "optical disk" which is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, and the like. Other like formats may also be included, such as similar formats and formats to be developed in the future.

The layer 14 can include, but is not limited to, the matrix, the inorganic acid and salts thereof, the radiation absorbing compound, the reactant compound, as well as other components typically found in the particular media to be produced.

The layer 14 may be applied to the substrate 12 via any acceptable method, such as, but not limited to, rolling, spraying, and screen-printing. In addition, one or more layers can be formed between the layer 14 and the substrate 12 and/or one or more layers can be formed on top of the layer 14. In one embodiment, the layer 14 is part of a CD or a DVD.

To form a mark, radiation energy is directed imagewise at one or more discrete areas of the layer 14 of the imaging medium 10. The form of radiation energy may vary, depending upon the equipment available, ambient conditions, the desired result, and the like. The radiation energy can include, but is not limited to, infrared (IR) radiation, ultraviolet (UV) radiation, x-rays, and visible light. The radiation absorbing compound absorbs the radiation energy and heats the area of the layer 14 to which the radiation energy impacts. The heat may cause the inorganic acid and salts thereof and the reactant compound to mix. The inorganic acid and salts thereof and the reactant compound may then react to form a mark (color) on certain areas of the layer 14.

Figure 2:
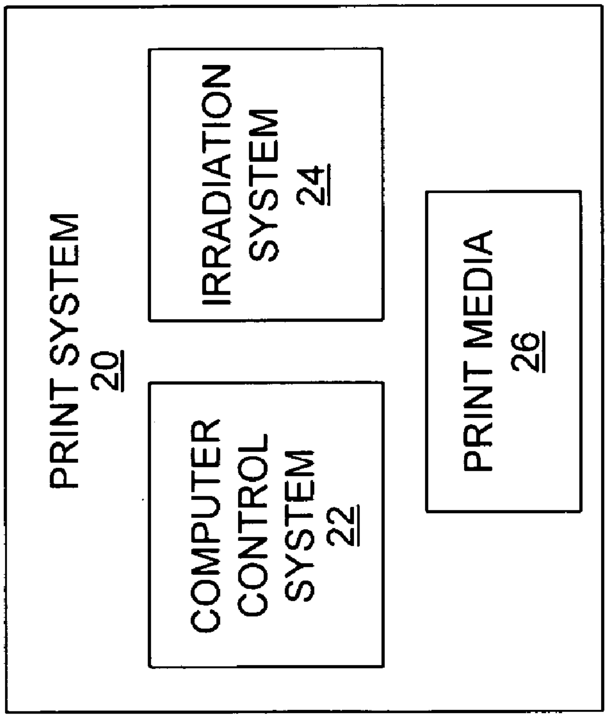
FIG. 2 illustrates a representative embodiment of a printer system.

FIG. 2 illustrates a representative embodiment of a print system 20. The print system 20 can include, but is not limited to, a computer control system 22, an irradiation system 24, and print media 26 (e.g., imaging medium). The computer control system 22 is operative to control the irradiation system 24 to cause marks (e.g., printing of characters, symbols, photos, and the like) to be formed on the print media 26. The irradiation system 24 can include, but is not limited to, a laser system, UV energy system, IR energy system, visible energy system, x-ray system, and other systems that can produce radiation energy to cause a mark to be formed on the layer 14. The print system 20 can include, but is not limited to, a laser printer system and an ink-jet printer system. In addition, the print system 20 can be incorporated into a digital media system. For example, the print system 20 can be operated in a digital media system to print labels (e.g., the two-phase layer is incorporated into a label) onto digital media such as CDs and DVDs. Furthermore, the print system 20 can be operated in a digital media system to directly print onto the digital media (e.g., the layer is incorporated in the structure of the digital media).

As mentioned above, the image layer can include, but is not limited to, the matrix, the inorganic acid and salts thereof, the radiation absorbing compound, and the reactant-compound. In another embodiment, the image layer also includes a color former and an activator compound.

The matrix 16 can include compounds capable of and/or suitable for dissolving and/or dispersing the radiation absorbing compound, the aromatic compound, the activator, and/or the color former. The matrix 16 can include, but is not limited to, UV curable monomers, oligomers, and pre-polymers (e.g., acrylate derivatives). Illustrative examples of UV-curable monomers, oligomers, and pre-polymers (that may be mixed to form a suitable UV-curable matrix) can include but are not limited to, polyvinyl alcohol, polyvinyl chloride, polyvinyl butyral, cellulose esters and blends such as cellulose acetate butyrate, polymers of styrene, butadiene, ethylene, poly carbonates, polymers of vinyl carbonates (e.g., CR39 (available from PPG industries, Pittsburgh)), co-polymers of acrylic and allyl carbonate momoners (e.g., BX-946 (available form Hampford Research, Strafford, Conn.)), hexamethylene diacrylate, tripropylene glycol diacrylate, lauryl acrylate, isodecyl acrylate, neopentyl glycol diacrylate, 2-phenoxyethyl acrylate, 2(2-ethoxy)ethylacrylate, polyethylene glycol diacrylate and other acrylated polyols, trimethylolpropane triacrylate, pentaerythritol tetraacrylate, ethoxylated bisphenol A diacrylate, acrylic oligomers with epoxy functionality, and the like.

The matrix compound 16 is about 2 wt % to 98 wt % of the layer and about 20 wt % to 90 wt % of the layer.

The inorganic acids and salts thereof can include, but are not limited to, inorganic phosphonium acids or salts thereof. The cation can be a potassium cation, sodium cation, and ammonium cation. The phosphonium acids or salts thereof can include, but are not limited to, phosphomolybdic acids or salts thereof; phosphotungstic acids or salts thereof; phosphovanadic acids or salts thereof; and combinations thereof. The inorganic acid and salts thereof is about 1 wt % to 20 wt % of the layer, from about 5 wt % to 20 wt % of the layer, and from about 10 wt % to 20 wt % of the layer.

The reactant compound can include, but is not limited to, lipids, steroids, lactones, keto acids, hydroxy acids, unsaturated fatty acids, phenolic compounds, organic amines, amino alcohols, sterols, terpenes, and combinations thereof. The reactant compound is about 5 wt % to 50 wt % of the layer and from about 8 wt % to 15 wt % of the layer.

The lipids can include, but are not limited to, fatty acid triglycerides, fatty acid alcohols, phosphatidyl choline, ether lipids, and the like.

The steroids can include, but are not limited to, cholesterol, phytosterol, and compounds with a triterpene skeleton with a 6, 6, 6, 5 cyclo system.

The hydroxy acids can include, but are not limited to, mandelic acid, malic acid, tartaric acid, and the like.

The unsaturated fatty acids can include, but are not limited to, linoleic, palmitoleic, arachidonoic acid, and the like.

The phenolic compounds can include, but are not limited to, alpha-naphtol, salicylic acid, vanillin, and the like.

The organic amines can include, but are not limited to, primary amines, secondary amines, and alpha-hydroxy amines. In one embodiment, the suppression agent can be a lower amine having from one to five carbon atoms. In another aspect, the suppression agent can be a primary amine. Exemplary suppression agents include, but are not limited to, 2-hydroxy-1-aminopropanol, butyl amine, valoneol, prolinol, 2-amino-3-phenyl-1-propanol, (R)-(−)-2-phenyl glycinol, 2-amino-phenylethanol, 1-naphthylethyl amine, 1-aminonaphthalene, morpholin, and mixtures thereof.

The amino alcohols can include, but are not limited to, valinol, phenyl glycinol, alaninol, and the like.

The sterol can include, but are not limited to, cholesterol, stigmasterol, phytosterols, and the like.

The terpenes can include, but are not limited to, terpeniol, camphor, borneol, myrtanol, menthenediol CAS 42370-41-2, and the like.

The term "radiation absorbing compound" (e.g., an antenna) means any radiation absorbing compound in which the antenna readily absorbs a desired specific wavelength of the marking radiation. The radiation absorbing compound may be a material that effectively absorbs the type of energy to be applied to the imaging medium 10 to effect a mark or color change.

The radiation absorbing compound can act as an energy antenna, providing energy to surrounding areas upon interaction with an energy source. As a predetermined amount of energy can be provided by the radiation absorbing compound, matching of the radiation wavelength and intensity to the particular antenna used can be carried out to optimize the system within a desired optimal range. Most common commercial applications can require optimization to a development wavelength of about 200 nm to about 900 nm, although wavelengths outside this range can be used by adjusting the radiation absorbing compound and color forming composition accordingly.

Suitable radiation absorbing compound can be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable radiation absorbing compounds can also be used and are known to those skilled in the art and can be found in such references as "Infrared Absorbing Dyes", Matsuoka, Masaru, ed., Plenum Press, New York, 1990 (ISBN 0-306-43478-4) and "Near-infrared Dyes for High Technology Applications", Daehne, Resch-Genger, Wolfbeis, Kluwer Academic Publishers (ISBN 0-7923-5101-0), both incorporated herein by reference.

Various radiation absorbing compounds can act as an antenna to absorb electromagnetic radiation of specific wavelengths and ranges. Generally, a radiation antenna which has a maximum light absorption at or in the vicinity of the desired development wavelength can be suitable for use in the present disclosure. For example, the color forming composition can be optimized within a range for development using infrared radiation having a wavelength from about 720 nm to about 900 nm. Common CD-burning lasers have a wavelength of about 780 nm and can be adapted for forming images by selectively developing portions of the image layer. Radiation absorbing compounds that can be suitable for use in the infrared range can include, but are not limited to, polymethyl indoliums, metal complex IR dyes, indocyanine green, polymethine dyes such as pyrimidinetrione-cyclopentylidenes, guaiazulenyl dyes, croconium dyes, cyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, and combinations thereof.

Several specific polymethyl indolium compounds are available from Aldrich Chemical Company and include 2-[2-[2-chloro-3-[2-(1,3-dihydro-1,3,3-trimethyl-2/-/-indol-2-ylidene)-ethylidene]-1-cyclopenten-1-yl-ethenyl]-1,3,3-trimethyl-3/-/-indolium perchlorate; 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3W-indolium chloride; 2-[2-[2-chloro-3-[(1,3-dihydro-3,3-dimethyl-1-propyl-2H-indol-2-yliden ethylidene]-1-cyclohexen-1-yl] ethenyl]-3,3-dimethyl-1-propyl indolium iodide; 2-[2-[2-chloro-3-[(1,3-dihydro-1,3,3-trimethyl-2H-indol-2-ylidene) ethylidene]-1-cyclohexen-1-yl]ethenyl]-1,3,3-trimethylindolium iodide; 2-[2-[2-chloro-3~[(1,3-dihydro-1,3,v3-trimethyl-2H-indol-2-ylidene) ethylidene]-1-cyclohexen-1-yl] ethenyl]-1,3,3-trimethylindolium perchlorate; 2-[2-[3-[(1,3-dihydro-3,3-dimethyl-1-propyl-2H-indol-2-ylidene) ethylidene]-2-(phenylthio)-1-cyclohexen-1-yl]ethenyl]-3,3-dimethyl-1-propylindolium perchlorate; and mixtures thereof. Alternatively, the radiation absorbing compound can be an inorganic compound (e.g., ferric oxide, carbon black, selenium, or the like). Polymethine dyes or derivatives thereof such as a pyrimidinetrione-cyclopentylidene, squarylium dyes such as guaiazulenyl dyes, croconium dyes, or mixtures thereof can also be used in the present invention. Suitable pyrimidinetrione-cyclopentylidene infrared antennae include, for example, 2,4,6(1H,3H,5H)-pyrimidinetrione 5-[2,5-bis[(1,3-dihydro-1,1,3-dimethyl-2H-indol-2-ylidene) ethylidene]cyclopentylidene]-1,3-dimethyl-(9CI) (S0322 available from Few Chemicals, Germany).

In another embodiment, the radiation absorbing compound can be selected for optimization of the color forming composition in a wavelength range from about 600 nm to about 720 nm, such as about 650 nm. Non-limiting examples of suitable radiation absorbing compound for use in this range of wavelengths can include indocyanine dyes such as 3H-indolium, 2-[5-(1,3-dihydro-3,3-dimethyl-1-propyl-2H-indol-2-ylidene)-1,3-pentadienyl]-3,3-dimethyl-1-propyl-,iodide) (Dye 724, $A_{max}$=642 nm), 3H-indolium,1-butyl-2-[5-(1-butyl-1,3-dihydro-3,3-dimethyl-2H-indol-2-ylidene)-1,3-pentadienyl]-3,3-dimethyl-, perchlorate (Dye 683, $A_{max}$=642 nm), and phenoxazine derivatives such as phenoxazin-5-ium, 3,7-bis(diethylamino)-perchlorate (oxazine, 1 $A_{max}$=645 nm). Phthalocyanine dyes having an $A_{max}$ of about the desired development wavelength can also be used such as silicon 2,3-napthalocyanine bis(trihexylsilyloxide) and matrix soluble derivatives of 2,3-napthalocyanine (both commercially available from Aldrich Chemical); matrix soluble derivatives of silicon phthalocyanine (as described in Rodgers, A. J. et al., 107 J. Phys. Chem. A 3503-3514, May 8, 2003), and matrix soluble derivatives of benzophthalocyanines (as described in Aoudia, Mohamed, 119 J. Am. Chem. Soc. 6029-6039, Jul. 2, 1997); phthalocyanine compounds such as those described in U.S. Pat. Nos. 6,015,896 and 6,025,486, which are each incorporated herein by reference; and Cirrus 715 (a phthalocyanine dye available from Avecia, Manchester, England having an $A_{max}$=806 nm).

In another embodiment, laser light having blue and indigo wavelengths from about 300 nm to about 600 nm can be used to develop the color forming compositions. Therefore, the present disclosure can provide color forming compositions optimized within a range for use in devices that emit wavelengths within this range. Recently developed commercial lasers found in certain DVD and laser disk recording equipment provide for energy at a wavelength of about 405 nm.

Thus, using appropriate radiation absorbing compound can be suited for use with components that are already available on the market or are readily modified to accomplish imaging. Radiation absorbing compounds that can be useful for optimization in the blue (~405 nm) and indigo wavelengths can include, but are not limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt (X max=400 nm); ethyl 7-diethylaminocoumarin-3-carboxylate (X max=418 nm); 3,3'-diethylthiacyanine ethylsulfate (X max=424 nm); 3-allyl-5-(3-ethyl-4-methyl-2-thiazolinylidene) rhodanine (X max=430 nm) (each available from Organica Feinchemie GmbH Wolfen), and mixtures thereof. Non-limiting specific examples of suitable aluminum quinoline complexes can include tris(8-hydroxyquinolinato)aluminum (CAS 2085-33-8) and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-d icyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH. Non-limiting examples of specific porphyrin and porphyrin derivatives can include etioporphyrin 1 (CAS 448-71-5), deuteroporphyrin IX 2,4bis ethylene glycol (D630-9) available from Frontier Scientific, and octaethyl porphrin (CAS 2683-82-1), azo dyes such as Mordant Orange CAS 2243-76-7, Merthyl Yellow (60-11-7), 4-phenylazoaniline (CAS 60-09-3), Alcian Yellow (CAS 61968-76-1), available from Aldrich chemical company, and mixtures thereof.

The radiation absorbing compound is from about 0.01 wt % to 10 wt % of the layer and from about 0.1 wt % to 3 wt % of the layer.

The term "color former" is a color forming substance, which is colorless or one color in a non-activated state and produces or changes color in an activated state. The color former can include, but is not limited to, leuco dyes and phthalide color formers (e.g., fluoran leuco dyes and phthalide color formers as described in "The Chemistry and Applications of Leuco Dyes", Muthyala, Ramiah, ed., Plenum Press (1997) (ISBN 0-306-45459-9), incorporated herein by reference).

The color forming composition can include a wide variety of leuco dyes. Suitable leuco dyes include, but are not limited to, fluorans, phthalides, amino-triarylmethanes, aminoxanthenes, aminothioxanthenes, amino-9,10-dihydro-acridines, aminophenoxazines, aminophenothiazines, aminodihydrophenazines, a minodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinon-es, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that fluoran-based dyes are one class of leuco dyes which exhibit particularly desirable properties.

In an embodiment, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilino-fluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino) fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-t-etrachloro-3,3-bis[2-[4-(dimethylamino)phenyl]-2-(4-methoxyphenyl)ethenyl]-, 2-anilino-3-methyl-6-(N-ethyl-N-isoamylamino)fluorane (S-205 available from Nagase Co., Ltd), and mixtures thereof. Suitable aminotriarylmethane leuco dyes can also be used in the present invention such as tris(N,N-dimethylaminophenyl)methane (LCV); tris(N,N-diethylaminophenyl) methane(LECV); tris(N,N-di-n-propylaminophenyl)methane (LPCV); tris(N,N-di-n-butylaminophenyl)methane (LBCV); bis(4-diethylaminophenyl)-(4-diethylamino-2-methyl-phenyl)methane (LV-1); bis(4-diethylamino-2-meth-ylphenyl)-(4-diethylamino-phenyl) methane (LV-2); tris(4-diethylamino-2-methylphenyl) methane (LV-3); bis(4-diethylamino-2-methylphenyl)(3,4-dimethoxy-phenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present invention and are known to those skilled in the art. A more detailed discussion of some of these types of leuco dyes may be found in U.S. Pat. Nos. 3,658,543 and 6,251,571, each of which are hereby incorporated by reference in their entireties. Additional examples and methods of forming such compounds can be found in Chemistry and Applications of Leuco Dyes, Muthyala, Ramaiha, ed., Plenum Press, New York, London; ISBN: 0-306-45459-9, which is hereby incorporated by reference.

The color former is from about 1 wt % to 80 wt % of the layer and from about 5 wt % to 50 wt % of the layer.

As used herein, the term "activator" is a substance that reacts with a color former and causes the color former to alter its chemical structure and change or acquire color. The activators may include, but is not limited to, proton donors and acidic phenolic compounds (e.g., benzyl hydroxybenzoate, bisphenol-A and bisphenol-S), as well as derivatives thereof (e.g., D8(4-hydroxyphenyl-4'-isopropoxyphenyl sulfone), TG-SA (bis(4-hydroxy-3-allylphenyl) sulfone) and polyphenols. The activator is from about 1 wt % to 40 wt % of the layer and from about 3 wt % to 25 wt % of the layer.

Example 1

A coating paste is prepared by mixing the following composition using finely ground solids and a 10% solution of polyvinyl alcohol (Avirol) (Table 1).

The paste was coated on an optical disc and dried at 30° C. and 20 mm vacuum for 0.5 h. The surface is exposed imagewise using a 780 nm laser at 35 Mw power and 0.25 m/sec line speed. Dark blue marks were produced on the locations of exposure.

TABLE 1

| Exemplary Formulation | |
|---|---|
| Phenyl Glycinol (CAS56613-80-0) | 0.20 g |
| Ammonium Hexamolybdate | 0.50 g |
| PVA | 1.00 g<br>(10 mL of 10% solution in Water) |
| Water | 5.00 g |
| Indocyanine Green | 0.015 g |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for preparing an image recording medium, the method comprising:

providing a matrix, a radiation absorbing compound, an inorganic acid or salt thereof, and a reactant compound, wherein the inorganic acid or salt thereof is phosphovanadic acids or salts thereof, wherein the reactant compound includes an alpha amino alcohols containing $NH_2C(R1,R2)CH_2OH$, wherein R1 and R2 each is independently selected from the following: hydrogen, aryl, and alkyl groups, wherein the radiation absorbing compound absorbs radiation and initiates a reduction/oxidation reaction between the inorganic acid or salts thereof and the reactant compound to produce a color change;

dissolving the radiation absorbing compound, the inorganic acid or salt thereof, and the reactant compound, in the matrix to form a matrix mixture; and disposing the matrix mixture onto a substrate, wherein the layer does not include a color former selected from a leuco dye and a phthalide color former.

2. The method of claim 1, wherein the substrate is selected from a paper medium and a transparency.

3. The method of claim 1, wherein the substrate is an optical disk.

4. An image recording medium comprising:

a substrate having a layer disposed thereon, wherein the layer includes:

a matrix;

a radiation absorbing compound;

an inorganic acid or salt thereof, wherein the inorganic acid or salt thereof is phosphovanadic acids or salts thereof; and a reactant compound, wherein the reactant compound includes an alpha amino alcohols containing $NH_2C(R1,R2)CH_2OH$, wherein R1 and R2 each independently selected from the following: hydrogen, aryl, and alkyl groups, wherein the radiation absorbing compound absorbs radiation and initiates a reduction/oxidation reaction between the inorganic acid or salts thereof and the reactant compound to produce a color change, wherein the layer does not include a color former selected from a leuco dye and a phthalide color former.

5. The image recording medium of claim 4, wherein the radiation absorbing compound is selected from: aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof.

6. An image recording medium comprising:

a substrate having a layer disposed thereon, wherein the layer includes:

a matrix;

a radiation absorbing compound;

an inorganic acid or salt thereof, wherein the inorganic acid or salt thereof is phosphovanadic acids or salts thereof; and a reactant compound, wherein the reactant compound is selected from one the following: camphor, phenyglycinol, cholesterol, and combinations thereof, wherein the layer does not include a color former selected from a leuco dye and a phthalide color former, wherein a color change is produced from a reaction between the inorganic acid or salt and the reactant compound.

7. The image recording medium of claim 6, wherein the substrate is selected from a paper medium and a transparency.

8. The image recording medium of claim 6, wherein the substrate is an optical disk format.

9. A method for preparing an image recording medium, the method comprising:

providing a matrix, a radiation absorbing compound, an inorganic acid or salt thereof, and a reactant compound, wherein the inorganic acid or salt thereof is phosphovanadic acids or salts thereof, and combinations thereof, wherein the reactant compound is selected from one the following: camphor, phenyglycinol, cholesterol, and combinations thereof, wherein the radiation absorbing compound absorbs radiation and initiates a reduction/oxidation reaction between the inorganic acid or salts thereof and the reactant compound to produce a color change;

dissolving the radiation absorbing compound, the inorganic acid or salt thereof, and the reactant compound, in the matrix to form a matrix mixture; and disposing the matrix mixture onto a substrate, wherein the layer does not include a color former selected from a leuco dye and a phthalide color former.

* * * * *

UNITED STATES PATENT AND TRADEMARK OFFICE

CERTIFICATE OF CORRECTION

PATENT NO. : 7,582,405 B2
APPLICATION NO. : 11/259659
DATED : September 1, 2009
INVENTOR(S) : Makarand P. Gore It is certified that error appears in the above-identified patent and that said Letters Patent is hereby corrected as shown below:

In column 10, lines 31-32, in Claim 6, delete “phenyglycinol,” and insert -- phenylglycinol, --, therefor.

In column 10, line 50, in Claim 9, delete “phenyglycinol,” and insert -- phenylglycinol, --, therefor.

Signed and Sealed this

Twenty-sixth Day of October, 2010

David J. Kappos

*Director of the United States Patent and Trademark Office*